US012617099B2

(12) United States Patent
　Zhang et al.

(10) Patent No.: US 12,617,099 B2
(45) Date of Patent: May 5, 2026

(54) IN-VEHICLE ROBOT

(71) Applicant: Nissan Motor Co., Ltd., Kanagawa (JP)

(72) Inventors: Laiqiang Zhang, Shanghai (CN); Lihong Wang, Shanghai (CN); Liang Chen, Shanghai (CN); Xiaolin Bai, Shanghai (CN); Yuqing Luo, Xiamen (CN)

(73) Assignee: Nissan Motor Co., Ltd., Kanagawa (JP)

(*) Notice: Subject to any disclaimer, the term of this patent is extended or adjusted under 35 U.S.C. 154(b) by 0 days.

(21) Appl. No.: 18/690,006

(22) PCT Filed: Jun. 22, 2022

(86) PCT No.: PCT/JP2022/024893
§ 371 (c)(1),
(2) Date: Mar. 7, 2024

(87) PCT Pub. No.: WO2023/037694
PCT Pub. Date: Mar. 16, 2023

(65) Prior Publication Data
US 2024/0383149 A1　　Nov. 21, 2024

(30) Foreign Application Priority Data

Sep. 10, 2021　(CN) .......................... 202111060358.X

(51) Int. Cl.
　*B25J 11/00*　　　(2006.01)
　*B25J 9/10*　　　(2006.01)
　*B25J 17/00*　　　(2006.01)
(52) U.S. Cl.
　CPC ............. *B25J 11/001* (2013.01); *B25J 9/102* (2013.01); *B25J 11/0015* (2013.01); *B25J 17/00* (2013.01)

(58) Field of Classification Search
　CPC .... B25J 11/001; B25J 11/0015; B25J 17/0283
　See application file for complete search history.

(56) References Cited

U.S. PATENT DOCUMENTS

| | | | | | |
|---|---|---|---|---|---|
| 3,103,620 | A | * | 9/1963 | Fraser | .................... G01C 19/60 |
| | | | | | 73/488 |
| 2015/0314454 | A1 | * | 11/2015 | Breazeal | ................. G10L 15/32 |
| | | | | | 700/259 |
| 2020/0009740 | A1 | * | 1/2020 | Youn | .................... B25J 11/0005 |

FOREIGN PATENT DOCUMENTS

| | | | |
|---|---|---|---|
| CN | 111872945 A | | 11/2020 |
| JP | 2019123055 A | * | 7/2019 |

* cited by examiner

*Primary Examiner* — Joseph Brown
*Assistant Examiner* — Gregory T Prather
(74) *Attorney, Agent, or Firm* — Osha Bergman Watanabe & Burton LLP

(57) ABSTRACT

An in-vehicle robot includes a base member, an outer member, an inner member, and first, second, and third power transmission units. The base member is rotatably mounted to a mounting object. The outer member is supported by the base member. The inner member is positioned inside the outer member and supported by the outer member. The first power transmission unit allows the inner member to rotate around a first axis with respect to the outer member. The first axis passes through a portion of the inner member supported by the outer member. The second power transmission unit allows the outer member to rotate around a second axis. The second axis passes through a portion of the outer member supported by the base member. The third power transmission unit allows the outer member to rotate around a third axis that is non-parallel to both the first axis and the second axis.

13 Claims, 6 Drawing Sheets

100

<u>Fig.6</u>
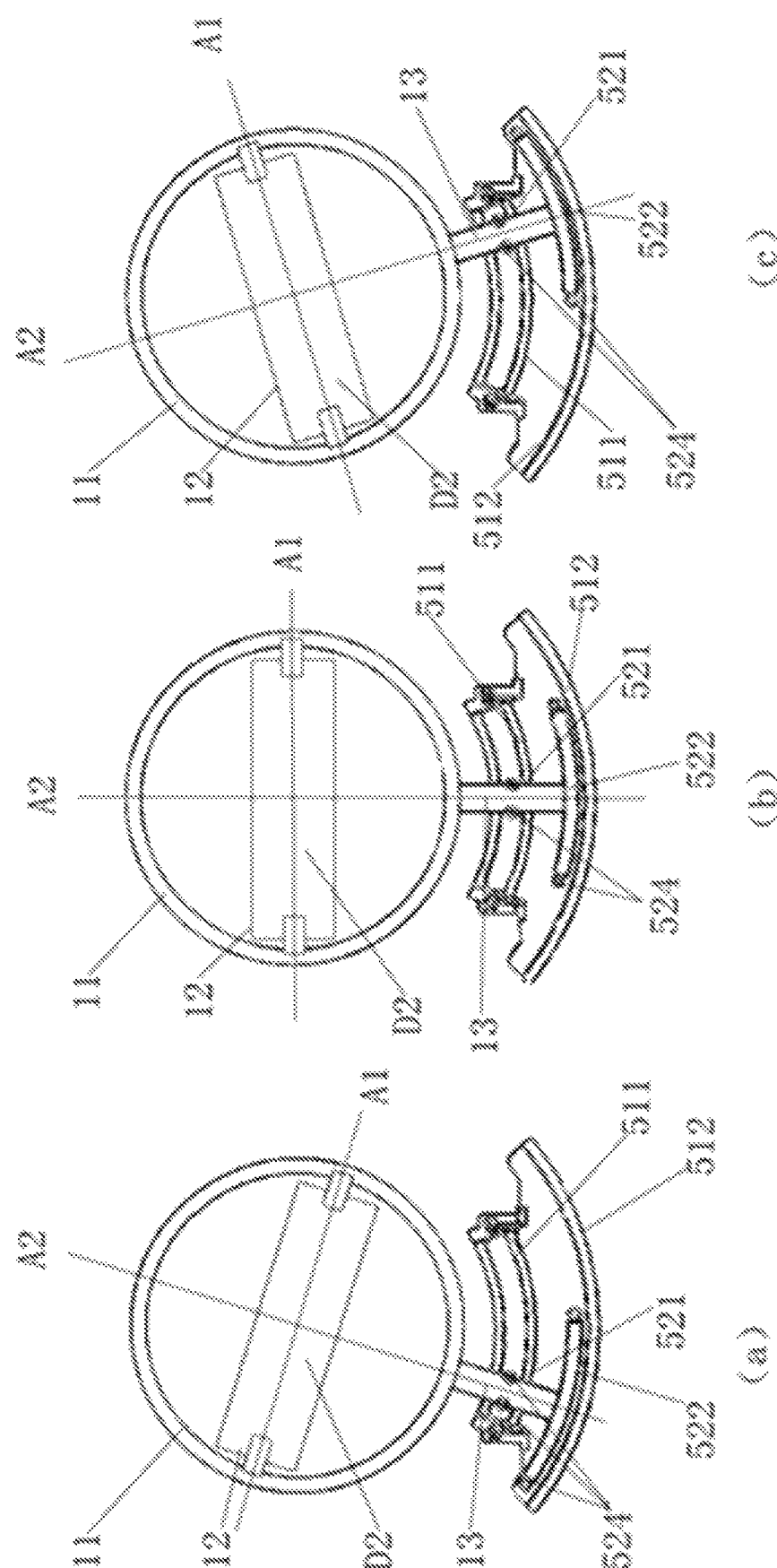

IN-VEHICLE ROBOT

TECHNICAL FIELD

The present invention relates to a field of in-vehicle robots, especially regarding an in-vehicle robot in an interior of an intelligent vehicle.

BACKGROUND ART

In association with intelligentization of automobiles, vehicle interiors applied with techniques of AI perception and thinking, such as vision, audio, and front-end incremental learning, are gaining popularity, and human-computer interaction is becoming more and more important. An in-vehicle robot is used as the main interface, and the head of the robot interacts with and offers feedback to a passenger according to the state or command of the passenger. This allows avoiding a mechanical image and a sense of command upon the interaction, and performing a more personified and natural interaction. For example, Patent Document 1 discloses an in-vehicle robot that simulates nodding and head shaking movements of a human by the head of the robot rotating up and down and rotating right and left within a predetermined angle range using power transmission between gears.

PRIOR ART DOCUMENT

Patent Document

Patent Document 1: CN-A-111872945

SUMMARY OF INVENTION

Problems to be Solved by Invention

However, in Patent Document 1, since the head of the in-vehicle robot can rotate only in two directions of the up-down direction and the right-left direction, and cannot simulate the movement of a human head rotating freely, personification and intelligentization are still not enough.

Means for Solving Problems

The present invention has been made in consideration of the above-described circumstances, and an object thereof is to provide an in-vehicle robot that can realistically and intelligently simulate movements of a human head.

A first aspect of the present invention provides an in-vehicle robot including a base member, an outer member, an inner member, a first power transmission unit, a second power transmission unit, and a third power transmission unit. The base member is rotatably mounted to a mounting object. The outer member is supported by the base member. The inner member is positioned inside the outer member and is supported by the outer member. The first power transmission unit allows the inner member to rotate around a first axis with respect to the outer member. The first axis passes through a portion of the inner member supported by the outer member. The second power transmission unit allows the outer member to rotate around a second axis. The second axis passes through a portion of the outer member supported by the base member. The third power transmission unit allows the outer member to rotate around a third axis that is non-parallel to both the first axis and the second axis.

A second aspect of the present invention provides an in-vehicle robot in which the second axis is positioned in a same plane as the first axis and intersects with the first axis, and the third axis intersects with the plane in which the first axis and the second axis are positioned.

A third aspect of the present invention provides an in-vehicle robot in which the third axis passes through an intersection point of the first axis and the second axis.

A fourth aspect of the present invention provides an in-vehicle robot in which the third power transmission unit includes a guiding member fixed to the base member and a moving member fixed to the outer member, and by configuring the moving member and the guiding member to be relatively movable, the outer member is linked to move so as to rotate around the third axis with respect to the base member.

A fifth aspect of the present invention provides an in-vehicle robot in which the guiding member includes a rail member, and the moving member is movable along a rail surface of the rail member.

A sixth aspect of the present invention provides an in-vehicle robot in which the third power transmission unit includes a third shaft motor that drives the outer member to rotate around the third axis by an intermediate gear.

A seventh aspect of the present invention provides an in-vehicle robot in which the moving member is provided with an arc-shaped teeth portion that meshes with the intermediate gear.

An eighth aspect of the present invention provides an in-vehicle robot in which a plurality of the rail members and/or a plurality of the moving members are provided.

A ninth aspect of the present invention provides an in-vehicle robot in which the rail member includes a first rail and a second rail that each have an arc shape, the first rail is positioned between the outer member and the second rail, an arc center of the first rail and an arc center of the second rail overlap, and the moving member includes a first moving member and a second moving member, the first moving member is movable along the first rail, and the second moving member is movable along the second rail.

A tenth aspect of the present invention provides an in-vehicle robot in which the moving member includes wheel portions and/or sliders provided at both end parts in a moving direction of the moving member.

An eleventh aspect of the present invention provides an in-vehicle robot in which the inner member is formed in a ring shape, and an inside of the inner member is provided with a first display that displays information.

A twelfth aspect of the present invention provides an in-vehicle robot in which an outer peripheral surface of the inner member is provided with a second display constituted as a part of the outer peripheral surface of the inner member.

A thirteenth aspect of the present invention provides an in-vehicle robot in which the second display displays an image simulating a human expression.

A fourteenth aspect of the present invention provides an in-vehicle robot in which the outer member and the inner member are formed in a circular ring shape.

A fifteenth aspect of the present invention provides an in-vehicle robot in which the outer member and the inner member are not driven by the first power transmission unit to the third power transmission unit, the first axis, the second axis, and the third axis are mutually orthogonal in a reference state at an initial position, the inner member rotates from the reference state around the first axis in an angle range of −90° to 90°, and/or the outer member rotates from the reference state around the second axis at an angle of −175° to 175°, and/or the outer member rotates from the reference state around the third axis at an angle of −19° to 19°.

A sixteenth aspect of the present invention provides an in-vehicle robot in which the outer member includes a pair of shaft portions that extend inward and are mutually opposed, the inner member is supported by the pair of shaft portions, the first axis passes through the pair of shaft portions, and the first power transmission unit includes a first shaft motor mounted to the inner member or the outer member, and the inner member is rotatable around the pair of shaft portions by driving of the first shaft motor.

A seventeenth aspect of the present invention provides an in-vehicle robot in which the second power transmission unit includes a second shaft motor fixed to the mounting object, and the base member, the outer member, the inner member, the first power transmission unit, and the third power transmission unit are integrally rotatable around the second axis by driving of the second shaft motor.

Effects of Invention

According to the present invention, the in-vehicle robot can move three-dimensionally and independently around three axes of a first axis, a second axis, and a third axis, and these movements can also be integrated, which allows realistically and intelligently simulating movements of a human head.

BRIEF DESCRIPTION OF DRAWINGS

FIG. 6 is a drawing illustrating rotation of the in-vehicle robot of the present invention, FIG. 6(a) is a drawing indicating that the head of the in-vehicle robot has rotated to a right side, FIG. 6(b) is a drawing indicating that the head of the in-vehicle robot is at the center position, and FIG. 6(c) is a drawing indicating that the head of the in-vehicle robot has rotated to a left side.

MODE(S) FOR CARRYING OUT THE INVENTION

Figure 1:
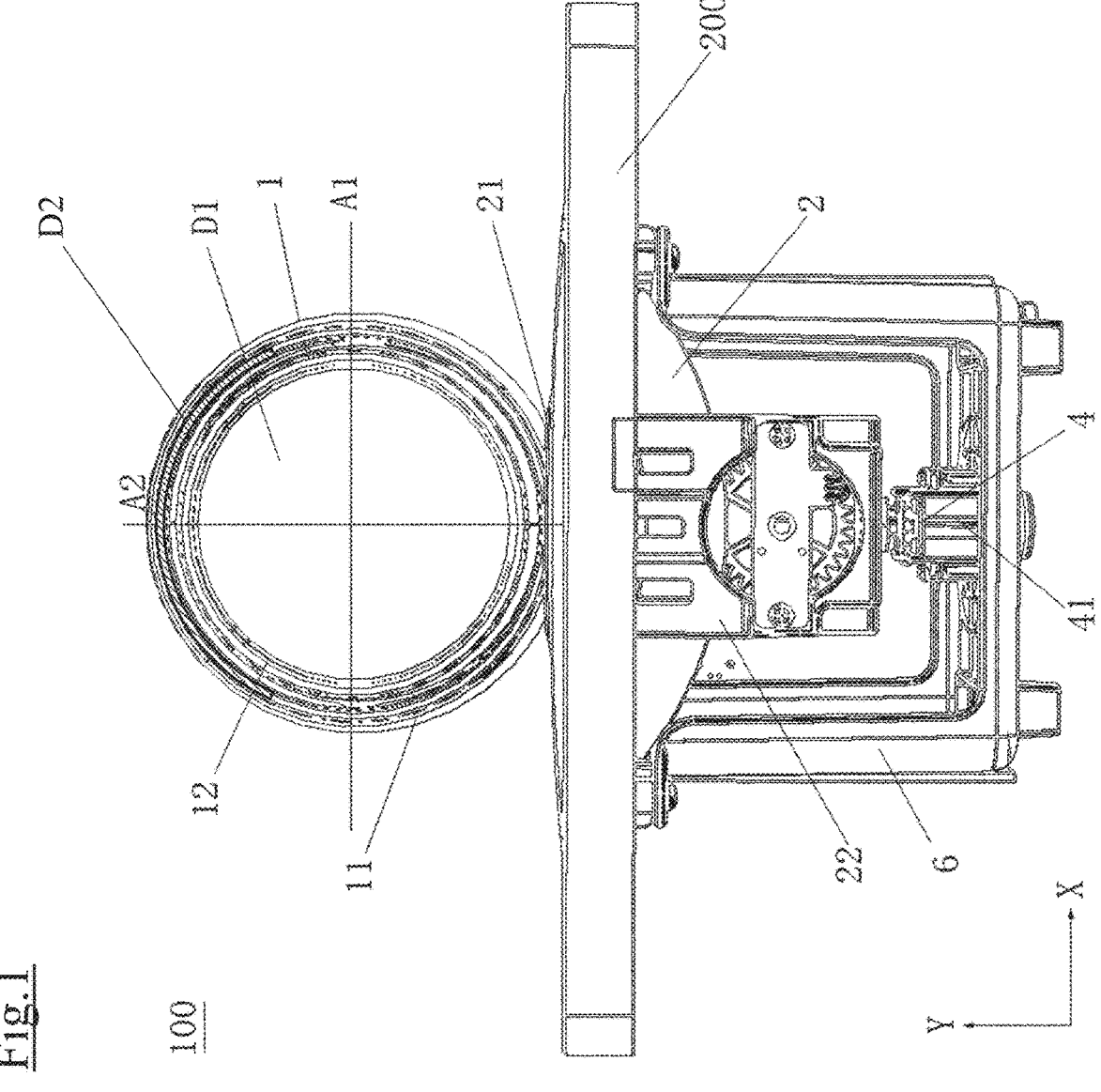
FIG. 1 is a front view of an in-vehicle robot of the present invention.

The following describes embodiments of the present invention with reference to the drawings. For ease of understanding, dimensions, scales and the like of the respective components that are illustrated are sometimes different from the actual dimensions, scales, and the like. The scales of the respective drawings are not necessarily constant. Also, the X-axis direction corresponds to a horizontal right-left direction, the Y-axis direction corresponds to an up-down direction, and the Z-axis direction corresponds to a direction that is perpendicular to both the X-axis and the Y-axis. The X-axis direction, the Y-axis direction, and the Z-axis direction are set to easily describe an in-vehicle robot 100 of the present invention, and need not conform to the actual mounting directions.

As illustrated in FIG. 1 to FIG. 6, the in-vehicle robot 100 of the present invention includes a main body portion 1, a base member 2, a first power transmission unit 3, a second power transmission unit 4, a third power transmission unit 5, and a casing 6. The main body portion 1 includes an outer member 11 and an inner member 12, the base member 2 includes a mounting base 21 and a supporting member 22, and the casing 6 is fixed with a controller 24 that controls operations of the first power transmission unit 3, the second power transmission unit 4, and the third power transmission unit 5. The first power transmission unit 3 allows the inner member 12 to rotate around a first axis A1 that passes through a portion of the inner member 12 supported by the outer member 11 with respect to the outer member 11, the second power transmission unit 4 allows the outer member 11 to rotate around a second axis A2 that passes through a portion of the outer member 11 supported by the base member 2, and the third power transmission unit 5 allows the outer member 11 to rotate around a third axis A3 that is non-parallel to both the first axis A1 and the second axis A2. Preferably, the first axis A1 and the second axis A2 are positioned in an identical plane, the first axis A1 and the second axis A2 intersect with each other, and the third axis A3 intersects with a plane formed by the first axis A1 and the second axis A2. More preferably, the third axis A3 passes through an intersection point of the first axis A1 and the second axis A2.

For convenience of explanation, the state illustrated in FIG. 1 is set as a reference state, and in the reference state, the main body portion 1 is at an initial position without being driven by the first power transmission unit 3 to the third power transmission unit 5. The initial position means that the outer member 11 and the inner member 12 are entirely positioned in the plane formed by the first axis A1 and the second axis A2, and the main body portion 1 is in an upright form. Preferably, the first axis A1, the second axis A2, and the third axis A3 are mutually orthogonal in the reference state. More preferably, the first axis A1 extends in the X-axis direction, the second axis A2 extends in the Y-axis direction, and the third axis A3 extends in the Z-axis direction in the reference state.

The outer member 11 and the inner member 12, which are both formed in a circular ring shape, are specifically formed in an approximately circular ring shape and disposed concentrically. The outer member 11 is supported by the base member 2, and specifically, the outer member 11 is rotatably supported by the mounting base 21. The inner member 12 is positioned inside the outer member 11, supported by the outer member 11, and an inner peripheral surface of the outer member 11 and an outer peripheral surface of the inner member 12 are separated by a predetermined space such that the inner member 12 does not interfere with the outer member 11 when rotating. Preferably, the inner peripheral surface of the outer member 11 and the outer peripheral surface of the inner member 12 are formed having curved surfaces of the same degree of arc, the outer peripheral surface of the inner member 12 is formed in a shape having a center projecting in a thickness direction (Z-axis direction in the reference state), and the inner peripheral surface of the outer member 11 is formed in a shape having a center depressed in the thickness direction. As illustrated in FIG. 1, preferably, on the inside of the inner member 12, a first display D1 is provided in a positive direction of the Z-axis, the first display D1 is formed in an approximately circular shape, a back plate (not illustrated) having a shape that is approximately the same as the first display D1 is provided in a negative direction of the Z-axis, the inner member 12, the first display D1, and the back plate collectively constitute the head of the in-vehicle robot 100 and define an internal space S of the inner member 12, and the internal space S is incorporated with electrical elements, such as a circuit board and a cable. An outer peripheral surface of the inner member 12 is provided with a second display D2, and the second display D2 is positioned on the positive direction side of the Y-axis of the inner member 12 in the reference state. Preferably, the second display D2 is a flexible display that is provided so as to match a contour shape of the inner member 12.

The following describes a power transmission structure of the in-vehicle robot 100 with reference to FIG. 2 to FIG. 5.

Figure 2:
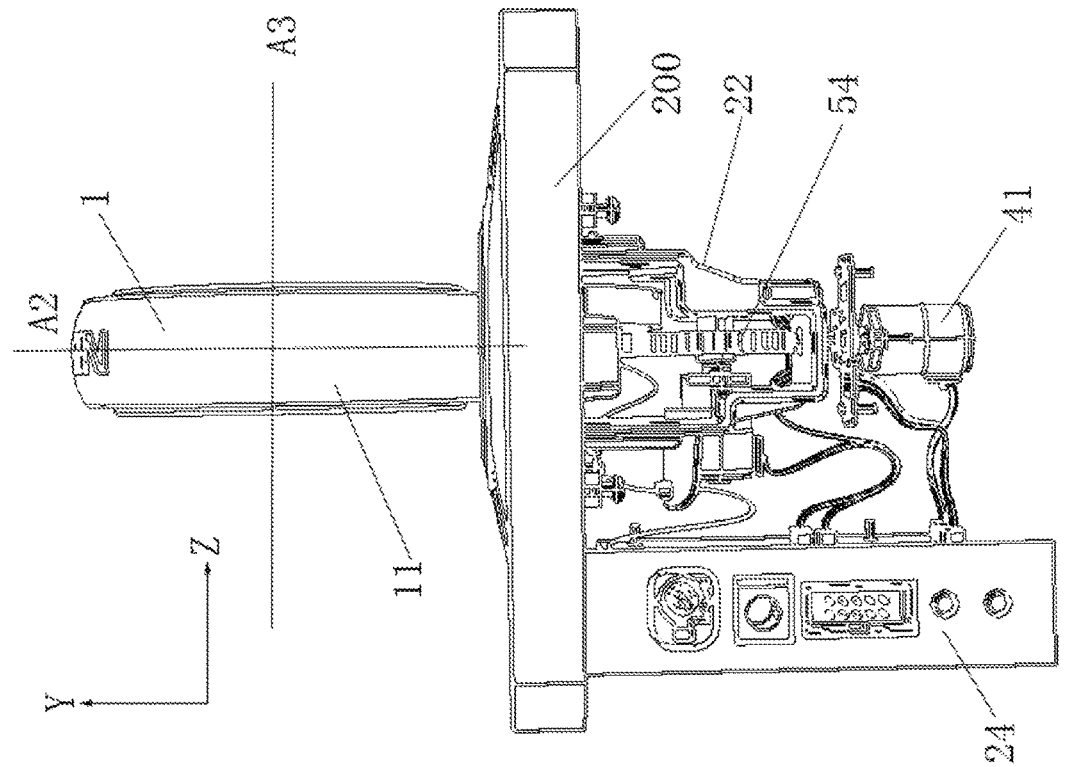
FIG. 2 is a side view of the in-vehicle robot of the present invention.
Figure 3:
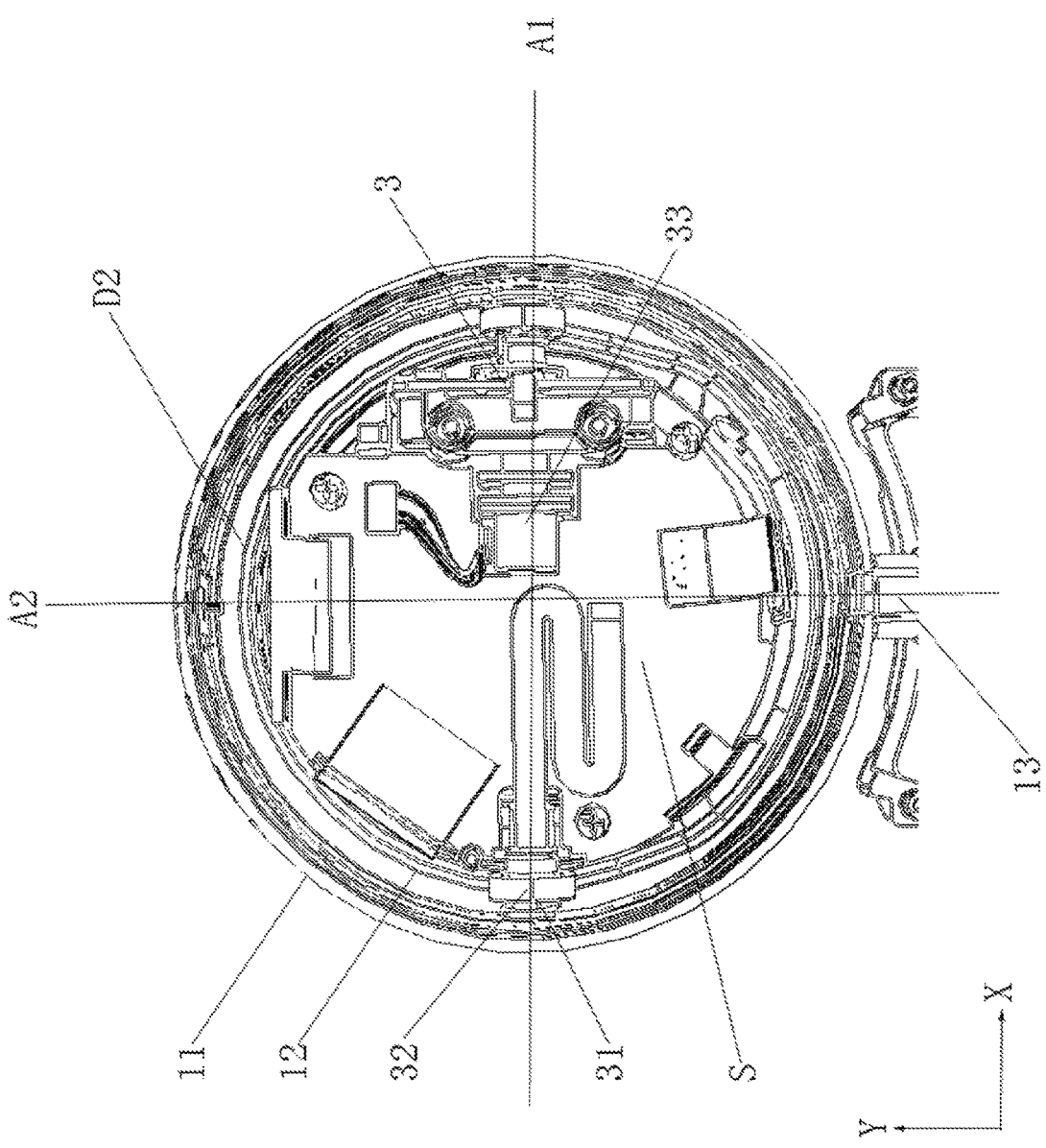
FIG. 3 is a drawing illustrating an internal structure of the head of the in-vehicle robot of the present invention.

A structure of the inner member 12 of the in-vehicle robot 100 rotating around the first axis A1 will be described with reference to FIG. 1 to FIG. 3. FIG. 1 is a front view of the in-vehicle robot 100, FIG. 2 is a side view of the in-vehicle robot 100 in which the casing 6 is omitted, and FIG. 3 is a partial cross-sectional view of the head of the in-vehicle robot 100 in which the first display D1 is omitted. A center position in the Y-axis direction of the inner peripheral surface of the outer member 11 is provided with respective shaft portions 31 that extend inward and are mutually opposed, and the first axis A1 passes through the pair of shaft portions 31. A corresponding position of the inner member 12 is provided with two first bearings 32, and the inner member 12 is rotatably mounted to the shaft portions 31 by the first bearings 32. A first shaft motor 33 is fixed to the inner member 12. The shaft portions 31, the first bearings 32, and the first shaft motor 33 collectively constitute the first power transmission unit 3. An output shaft (not illustrated) of the first shaft motor 33 is connected to the shaft portions 31, and when the first shaft motor 33 is driven, the inner member 12 is caused to rotate around the first axis A1 with respect to the outer member 11 by a reactive force of the output shaft. Preferably, the inner member 12 rotates from the reference state around the first axis A1 in an angle range of −90° to 90° by forward and reverse rotation of the first shaft motor 33, and thereby an up-down nodding movement of a human is simulated.

Figure 4:
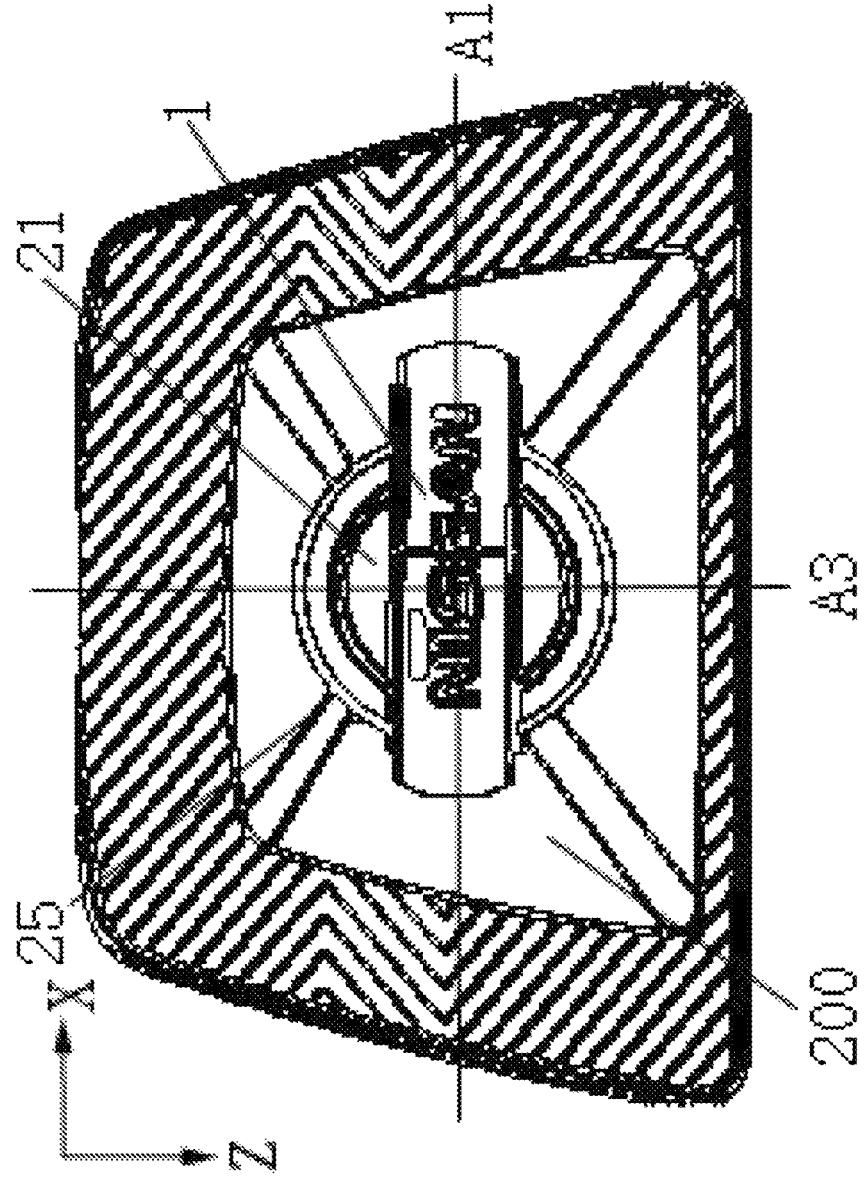
FIG. 4 is a plan view of the in-vehicle robot of the present invention mounted to a mounting object.

A structure of the outer member 11 of the in-vehicle robot 100 rotating around the second axis A2 will be described with reference to FIG. 1 and FIG. 4. The supporting member 22 is fixed to a lower surface of the mounting base 21, and as illustrated in FIG. 4, the mounting base 21 is rotatably supported by a second bearing 25 to a mounting object, such as a dashboard 200 of a vehicle. The main body portion 1, the base member 2, the first power transmission unit 3, and the third power transmission unit 5 described later are assembled together to constitute an assembled body. The mounting base 21, the supporting member 22, the second bearing 25, and a second shaft motor 41 collectively constitute the second power transmission unit 4. The casing 6 is fixed to a lower surface of the dashboard 200, and the supporting member 22, the second shaft motor 41, and the third power transmission unit 5 are positioned inside the casing 6. The second shaft motor 41 is fixed to the casing 6 under the supporting member 22 and thereby fixed to the dashboard 200, and an output shaft (not illustrated) thereof is connected to the supporting member 22. When the second shaft motor 41 is driven, the assembled body rotates around the second axis A2. Preferably, the outer member 11 rotates from the reference state around the second axis A2 in an angle range of −175° to 175° by the forward and reverse rotation of the second shaft motor 41, and thereby a movement of rotating a human neck is simulated.

6

Figure 5:
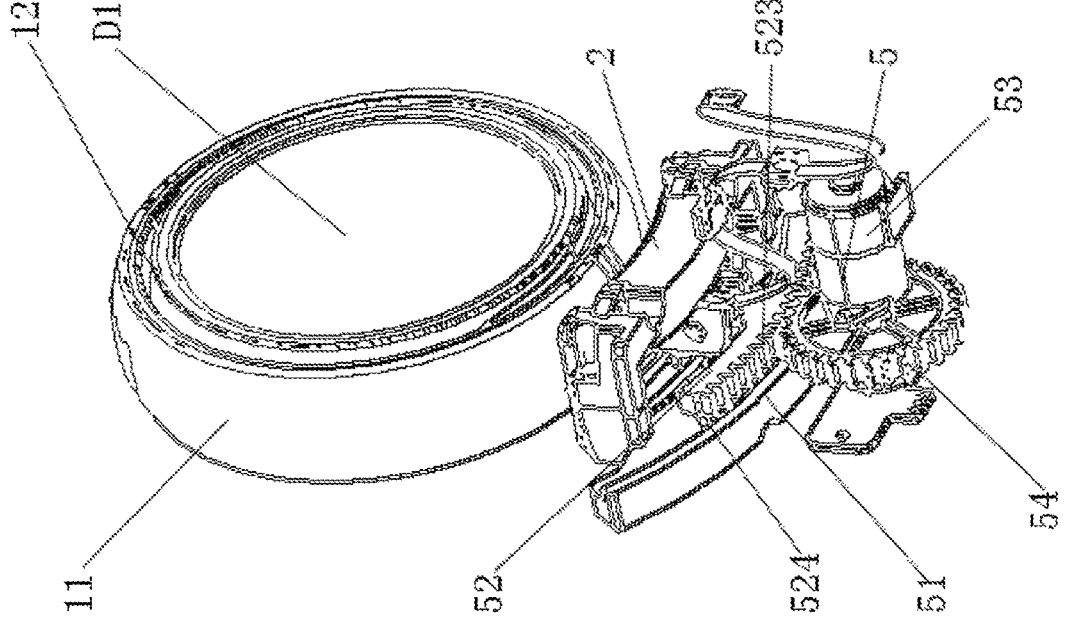
FIG. 5 is a perspective view of the in-vehicle robot of the present invention.

A structure of the outer member 11 of the in-vehicle robot 100 rotating around the third axis A3 will be described with reference to FIG. 5 and FIG. 6. A lowermost part of the outer member 11 is provided with a pillar member 13, and the outer member 11 is connected to the third power transmission unit 5 by the pillar member 13. The pillar member 13 is provided with a rail member 51 as a guiding member, and the rail member 51 is provided to the supporting member 22, thereby being fixed to the base member 2. The rail member 51 includes a first rail 511 and a second rail 512, the first rail 511 and the second rail 512 are each formed in an arc shape, and an arc center of the first rail 511 and an arc center of the second rail 512 overlap. Preferably, the first rail 511 and the second rail 512 are disposed concentrically with the outer member 11. Rail surfaces of the first rail 511 and the second rail 512 face upward. The first rail 511 is provided between the outer member 11 and the second rail 512. The first rail 511 and the second rail 512 are each disposed axially symmetric with respect to the second axis A2, and the first rail 511 has a length shorter than the second rail 512. Both ends of the first rail 511 and the second rail 512 are each provided with a position restriction structure (not illustrated) and restrict positions of right-left swings of a first moving part 521 and a second moving part 522 described later. The pillar member 13 is provided with a moving member 52, and the moving member 52 is fixed to the outer member 11, supported by the rail member 51, and is movable along the rail member 51 by driving of a motor 53 described later. Preferably, the moving member 52 includes the first moving part 521 and the second moving part 522, and the first moving part 521 and the second moving part 522 are formed in an arc shape and are disposed concentrically with the outer member 11. The first moving part 521 moves along the first rail 511, and the second moving part 522 moves along the second rail 512. Preferably, the moving member 52 is provided with an arc-shaped teeth portion 523, and the arc-shaped teeth portion 523 is formed on a lower surface of the second moving part 522. Preferably, the first moving part 521 and the second moving part 522 are each disposed symmetrically with respect to the pillar member 13, in other words, when viewed from the Z axis direction, the pillar member 13 is disposed at a midpoint position of each the first moving part 521 and the second moving part 522. Preferably, when positioned at the initial position, the main body portion 1, the pillar member 13, the rail member 51, and the moving member 52 are disposed axially symmetric with respect to the second axis A2. Preferably, as illustrated in FIGS. 5 and 6, both end parts in the moving direction of the first moving part 521 and the second moving part 522 are each fixed with a wheel portion 524, and the wheel portions 524 of each the first moving part 521 and the second moving part 522 are slidable along the rail surfaces of the first rail 511 and the second rail 512. The supporting member 22 is fixed with the third shaft motor 53, an output shaft (not illustrated) of the third shaft motor 53 is provided with an intermediate gear 54, and the intermediate gear 54 can mesh with the arc-shaped teeth portion 523. The rail member 51, the moving member 52, the third shaft motor 53, and the intermediate gear 54 collectively constitute the third power transmission unit 5. The third shaft motor 53 causes the outer member 11 to rotate around the third axis A3 by the intermediate gear 54. When the third shaft motor 53 is driven, the first moving part 521 and the second moving part 522 are each slidable along the first rail 511 and the second rail 512, which causes the outer member 11 to rotate around the third axis A3. Preferably, the outer member 11 rotates from the reference state around the third axis A3 in an angle range of −19° to 19° by the forward and reverse rotation of the third shaft motor 53, and thereby a movement of laterally tilting a human head is simulated.

The following describes operations of the in-vehicle robot 100.

The first display D1 may display various information, such as the state of a vehicle, weather, and the temperature inside the vehicle. The second display D2 may display a screen simulating a human expression, such as a screen displaying the movement of eyes in accordance with an action to be executed. As illustrated in FIG. 1, when a command is not received, the in-vehicle robot 100 is in the reference state, the second display D2 is in an off state, and the in-vehicle robot 100 is in a state in which the first display D1 is facing a passenger. After receiving a command, the controller 24 controls at least one of the first power transmission unit 3, the second power transmission unit 4, and the third power transmission unit 5 and drives the head of the in-vehicle robot 100 such that it performs the up-down nodding movement, the movement of laterally tilting the head, or the movement of rotating the neck, or a movement combining these movements. For example, the in-vehicle robot 100 can determine the position of a passenger that has outputted a voice command by another in-vehicle sensor and rotate the second display D2 such that it faces the position of the passenger. After completing the commanded movement, when the second display D2 is turned off, the in-vehicle robot 100 returns to the state in which the first display D1 is facing the passenger.

Other Embodiments

In the above-described embodiment, in the reference state, the first axis, the second axis, and the third axis are mutually orthogonal. However, the third axis may intersect with a plane formed by the first axis and the second axis, and the first axis, the second axis, and the third axis may intersect at another angle. Moreover, the first axis, the second axis, and the third axis need not intersect at a single point. For example, the third axis may be positioned below the intersection point of the first axis and the second axis. Also, the first axis and the second axis need not be positioned in an identical plane.

In the above-described embodiment, the outer member of the in-vehicle robot is formed in a circular ring shape, and it is not limited to this, and as long as it is a structure that can support the inner member to be rotatable around the first axis, the outer member may be formed in another shape, such as a polygon or an ellipsoid, or may be formed in an open shape, such as a ring shape that is partially cut out, as necessary.

In the above-described embodiment, a back plate having a circular shape is provided in the negative direction of the Z-axis, but it is not limited to this, and a third display may be additionally provided in the negative direction of the Z-axis as necessary. Also, the shapes of the first display and the third display need not be a circular shape, and they may be formed in other shapes, such as an ellipsoid or a polygon, as necessary.

In the above-described embodiment, the first shaft motor is fixed to the inner member but may be fixed to the outer member. Also, the first shaft motor may be provided separately to each of the two shaft portions.

In the above-described embodiment, the third power transmission unit is driven so as to cause the outer member to rotate around the third axis by the intermediate gear. However, it is not limited to this, and as long as it is a structure that can be driven so as to cause the outer member to rotate around the third axis, other power transmission systems, such as a worm gear power transmission, a chain power transmission, or a belt power transmission, may be employed according to, for example, a space, a layout, or the like.

In the above-described embodiment, the rail member is fixed to the base member, but the rail member may be fixed to the outer member, and the base member may be provided with a wheel portion. In this case, the wheel portion functions as the guiding member.

In the above-described embodiment, the rail member is disclosed as the guiding member, but as long as it is a structure that can guide the movement of the moving member, any structure such as a groove, a guide pin, or a guide roller may be employed.

In the above-described embodiment, the third power transmission unit includes two rails and two moving members, but it is not limited to this, and as long as it is a structure that allows the outer member to rotate smoothly, for example, one rail and one moving member may be employed, three or more rails and three or more moving members may be employed, and the number of rails and the number of moving members may be different.

In the above-described embodiment, for the third power transmission unit, a structure in which the wheel portions slide on the rail surfaces of the rails is employed. However, it is not limited to this, and as long as it is a structure that allows the outer member to rotate smoothly, for example, a structure in which sliders slide on the rail surfaces may be employed, and bearings may be employed instead of fitting of the rails and the moving members.

In the above-described embodiment, the two moving members are each positioned above the rails, but it is not limited to this, and as long as it is a structure that allows the outer member to rotate smoothly, and can stably support the outer member, for example, the first moving member may slide on a rail surface provided on a lower surface of the first rail, and the second moving member may slide on a rail surface provided on a lower surface of the second rail.

In the above-described embodiment, the first moving member and the second moving member are formed in an arc shape, but it is not limited to this, and the first moving member and the second moving member need only be structured to rotate around the arc centers of the first rail and the second rail. For example, the first moving member may be formed in an elongated shape.

In the above-described embodiment, a casing is provided, but it is not limited to this, and the casing may be omitted according to the space, layout, or the like. In this case, the controller may be fixed to the supporting member, and the second shaft motor may be fixed to the mounting object.

The following describes effects of the present embodiment.

In the present embodiment, the in-vehicle robot 100 includes the base member 2, the outer member 11, the inner member 12, the first power transmission unit 3, the second power transmission unit 4, and the third power transmission unit 5. The base member 2 is rotatably mounted to the mounting object 200. The outer member 11 is supported by the base member 2. The inner member 12 is positioned inside the outer member 11 and is supported by the outer member 11. The first power transmission unit 3 allows the inner member 12 to rotate around the first axis A1 with respect to the outer member 11. The first axis A1 passes through a portion of the inner member 12 supported by the outer member 11. The second power transmission unit 4 allows the outer member 11 to rotate around the second axis A2. The second axis A2 passes through a portion of the outer member 11 supported by the base member 2. The third power transmission unit 5 allows the outer member 11 to rotate around the third axis A3 that is non-parallel to both the first axis A1 and the second axis A2. Thus, the in-vehicle robot 100 can move three-dimensionally and independently around the three axes of the first axis A1, the second axis A2, and the third axis A3, and these movements can also be integrated, which allows realistically and intelligently simulating movements of a human head.

In the present embodiment, the second axis A2 is positioned in the same plane as the first axis A1 and intersects with the first axis A1, and the third axis A3 intersects with the plane in which the first axis A1 and the second axis A2 are positioned. Thus, the in-vehicle robot 100 can be easily set to move three-dimensionally around the three axes of the first axis A1, the second axis A2, and the third axis A3, and a more realistic personification effect can be obtained.

In the present embodiment, the third axis A3 passes through an intersection point of the first axis A1 and the second axis A2. Thus, the in-vehicle robot 100 can be more easily set to move three-dimensionally around the three axes of the first axis A1, the second axis A2, and the third axis A3, and a more realistic personification effect can be obtained.

In the present embodiment, the third power transmission unit 5 includes the guiding member 51 fixed to the base member 2 and the moving member 52 fixed to the outer member 11, and by configuring the moving member 52 and the guiding member 51 to be relatively movable, the outer member 11 is linked to move so as to rotate around the third axis A3 with respect to the base member 2. Thus, the outer member 11 can be guided to rotate around the third axis A3 by a simple structure.

In the present embodiment, the guiding member 51 includes the rail member 51, and the moving member 52 is movable along a rail surface of the rail member 51. Thus, the moving member 52 can be guided and supported such that the outer member 11 can smoothly rotate around the third axis A3 by the rail member 51.

In the present embodiment, the third power transmission unit 5 includes the third shaft motor 53 that is driven so as to cause the outer member 11 to rotate around the third axis A3 by the intermediate gear 54. Thus, the outer member 11 can be surely driven so as to rotate around the third axis A3 by the gear power transmission, and a rotating angle of the outer member 11 can be accurately controlled, which allows the outer member 11 to be maintained in a desired posture.

In the present embodiment, the moving member 52 is provided with the arc-shaped teeth portion 523 that meshes with the intermediate gear 54. Thus, the moving member 52 can be directly driven by the intermediate gear 54, which allows the moving member 52 to be surely moved along the guiding member 51.

In the present embodiment, a plurality of the rail members 51 are provided and/or a plurality of the moving members 52 are provided. Thus, a combination of the plurality of rail members 51 and the moving members 52 allows surely supporting and guiding the outer member 11 rotating around the third axis A3.

In the present embodiment, the rail member 51 includes the first rail 511 and the second rail 512 that each have an arc shape, the first rail 511 is positioned between the outer member 11 and the second rail 512, an arc center of the first rail 511 and an arc center of the second rail 512 overlap, and the moving member 52 includes the first moving part 521 and the second moving part 522, the first moving part 521 is movable along the first rail 511, and the second moving part 522 is movable along the second rail 512. Thus, the outer member 11 can be dually supported and guided, which allows avoiding an unintended movement of the outer member 11 due to a fitting failure between the rail member 51 and the moving member 52.

In the present embodiment, the moving member 52 includes the wheel portions 524 and/or the sliders provided at both end parts in a moving direction of the moving member 52. Thus, the outer member 11 can be guided to rotate around the third axis A3 by a simple structure, and by providing the wheel portions 524 and/or the sliders at both end parts in the moving direction, processing accuracy and dimension requirement of the moving member 52 can be made low, which allows achieving cost reduction and weight reduction.

In the present embodiment, the inner member 12 is formed in a ring shape, and an inside of the inner member 12 is provided with the first display D1 that displays information. Thus, appearance quality can be improved, and a display area can be increased so as to display more information.

In the present embodiment, an outer peripheral surface of the inner member 12 is provided with the second display D2 constituted as a part of the outer peripheral surface of the inner member 12. Thus, the action of a human head can be realistically simulated, personification quality and intelligence can be improved, and a better user experience can be achieved.

In the present embodiment, the second display D2 displays an image simulating a human expression. Thus, personification quality and intelligence can be improved, and a better user experience can be achieved.

In the present embodiment, the outer member 11 and the inner member 12 are formed in a circular ring shape. Thus, the structure of the in-vehicle robot 100 can be simplified, a good personification quality can be achieved, and a better user experience can be achieved.

In the present embodiment, the outer member 11 and the inner member 12 are not driven by the first power transmission unit 3 to the third power transmission unit 5, the first axis A1, the second axis A2, and the third axis A3 are mutually orthogonal in a reference state at the initial position, the inner member 12 rotates from the reference state around the first axis A1 in an angle range of −90° to 90°, and/or the outer member 11 rotates from the reference state around the second axis A2 at an angle of −175° to 175°, and/or the outer member 11 rotates from the reference state around the third axis A3 at an angle of −19° to 19°. Thus, the in-vehicle robot 100 can be more easily set to move three-dimensionally around the three axes of the first axis A1, the second axis A2 and the third axis A3, a more realistic personification effect can be achieved, and the up-down nodding movement of a human head, the movement of rotating the neck, the movement of laterally tilting the head, and a movement combining these movements can be more realistically and intelligently simulated. Therefore, personification quality and intelligence can be improved, a better user experience can be achieved, and a rotating period and strokes of the in-vehicle robot 100 can be saved.

In the present embodiment, the outer member 11 includes the pair of shaft portions 31 that extend inward and are mutually opposed, the inner member 12 is supported by the pair of shaft portions 31, the first axis A1 passes through the pair of shaft portions 31, and the first power transmission unit 3 includes the first shaft motor 33 mounted to the inner member 12 or the outer member 11, and the inner member 12 is rotatable around the pair of shaft portions 31 by driving of the first shaft motor 33. Thus, the in-vehicle robot 100 can be caused to rotate around the first axis A1 by a simple structure, and downsizing of the in-vehicle robot 100 can be achieved.

The second power transmission unit 4 includes the second shaft motor fixed to the mounting object, and the base member 2, the outer member 11, the inner member 12, the first power transmission unit 3, and the third power transmission unit 5 are integrally rotatable around the second axis A2 by driving of the second shaft motor. Thus, the in-vehicle robot 100 can be caused to rotate around the second axis A2 by a simple structure, and downsizing of the in-vehicle robot 100 can be achieved.

It should be understood that the above-described embodiments are simply examples, and are not intended to limit the present invention. Under the teachings of the present invention, a person skilled in the art can perform the above-described embodiments by making various changes within a range that does not depart from the gist thereof.

The invention claimed is:

1. An in-vehicle robot comprising:
a base member mounted to a dashboard;
an outer member supported by the base member;
an inner member positioned inside the outer member and supported by the outer member;
a first power transmission unit that allows the inner member to rotate around a first axis with respect to the outer member, the first axis passing through a portion of the inner member supported by the outer member;
a second power transmission unit that allows the outer member to rotate around a second axis, the second axis passing through a portion of the outer member supported by the base member; and
a third power transmission unit that allows the outer member to rotate around a third axis that is non-parallel to both the first axis and the second axis,
wherein the third power transmission unit is positioned inside a casing fixed to a lower surface of the dashboard,
wherein the inner member is formed in a ring shape, and an inside of the inner member is provided with a first display that displays information, and
wherein an outer peripheral surface of the inner member is provided with a second display constituted as a part of the outer peripheral surface of the inner member.

2. The in-vehicle robot according to claim 1,
wherein the second axis is positioned in a same plane as the first axis and intersects with the first axis, and
wherein the third axis intersects with the plane in which the first axis and the second axis are present.

3. The in-vehicle robot according to claim 2, wherein the third axis passes through an intersection point of the first axis and the second axis.

4. The in-vehicle robot according to claim 1, wherein the third power transmission unit includes a guiding member fixed to the base member and a moving member fixed to the outer member, and by configuring the moving member and the guiding member to be relatively movable, the outer member is linked to move so as to rotate around the third axis with respect to the base member.

5. The in-vehicle robot according to claim 4,
wherein the guiding member includes a rail member, and
wherein the moving member is movable along a rail surface of the rail member.

6. The in-vehicle robot according to claim 5,
wherein the rail member includes a plurality of rails and/or the moving member includes a plurality of moving parts.

7. The in-vehicle robot according to claim 5,
wherein the rail member includes a first rail and a second rail that each have an arc shape, the first rail is positioned between the outer member and the second rail, an arc center of the first rail and an arc center of the second rail overlap, and
wherein the moving member includes a first moving part and a second moving part, the first moving part is movable along the first rail, and the second moving part is movable along the second rail.

8. The in-vehicle robot according to claim 5, wherein the moving member includes wheel portions and/or sliders provided at end parts in a moving direction of the moving member.

9. The in-vehicle robot according to claim 4, wherein the third power transmission unit includes a third shaft motor that drives the outer member to rotate around the third axis by an intermediate gear.

10. The in-vehicle robot according to claim 9, wherein the moving member is provided with an arc-shaped teeth portion that meshes with the intermediate gear.

11. The in-vehicle robot according to claim 1, wherein the outer member and the inner member are formed in a circular ring shape.

12. The in-vehicle robot according to claim 1,
wherein the first axis, the second axis, and the third axis are mutually orthogonal in a reference state at an initial position,
wherein at least one of the following conditions is satisfied:
the inner member rotates from the reference state around the first axis in an angle range of −90° to 90°,
the outer member rotates from the reference state around the second axis at an angle of −175° to 175°, and
the outer member rotates from the reference state around the third axis at an angle of −19° to 19°.

13. The in-vehicle robot according to claim 1,
wherein the outer member includes a pair of shaft portions that extend inward and are mutually opposed, the inner member is supported by the pair of shaft portions, the first axis passes through the pair of shaft portions, and the first power transmission unit includes a first shaft motor mounted to the inner member or the outer member, and
wherein the inner member is rotatable around the pair of shaft portions by driving of the first shaft motor.

* * * * *